Patented Mar. 16, 1943

2,314,111

UNITED STATES PATENT OFFICE 2,314,111

COATING MINERAL AGGREGATES

Elton B. Tucker, Highland, Ind., and Henry M. Grubb, Chicago, Ill., assignors to Standard Oil Company, Chicago, Ill., a corporation of Indiana No Drawing. Application October 29, 1940, Serial No. 363,348

2 Claims. (Cl. 106—273)

The present invention relates to improvements in coating mineral aggregates with oil or bituminous materials and more particularly to the use of surface-active agents to improve the adherence of bituminous materials or oils to siliceous aggregates in the presence of water.

Oils and/or bituminous paving materials do not coat and adhere well to mineral aggregates unless the aggregate is substantially dry, and for this reason in conventional pavement or road construction practice it is customary to dry the mineral aggregate by suitable well-known methods such as by heating or air drying. Furthermore, water entering the road or pavement during service also may have a detrimental effect, in that it may displace the oil or bitumen from the surface of the aggregate and thus diminish the bonding effect of the bitumen. This materially shortens the life of the road or pavement, requiring frequent repairs and is therefore highly undesirable.

Mineral aggregates employed in road or pavement construction range in character from hydrophilic to hydrophobic. In general, siliceous and acidic minerals tend to be hydrophilic, and calcareous alkaline minerals tend to be hydrophobic. It has been observed that siliceous acidic minerals have a greater attraction for water than for oil or bitumens, and that it is difficult to obtain, by conventional methods, complete or satisfactory coating of such aggregates by oil or bitumen when water is present. Further, even though satisfactory coating is obtained by using dry aggregate, the film of oil or bitumen tends to be displaced if water enters the pavement. While alkaline, calcareous, hydrophobic aggregates, such as limestone, in general exhibit less tendency to stripping of the bituminous coating or film by water than do hydrophilic aggregates, even when hydrophobic aggregates are used the oil or bitumen does not always resist displacement from the aggregate surface by water.

It is the object of the present invention to provide an agent which promotes the adherence of oil and bituminous materials to siliceous aggregates without the necessity of drying the same. Another object of the invention is to provide a means of preventing stripping of the oil or bitumen from the aggregate by water after the road or pavement or other structure is constructed. Other objects and advantages of the invention will become apparent as the description thereof proceeds.

We have discovered that the foregoing objects can be attained by using as a coating agent compounds capable of forming a positively charged surface-active ion. The preferred embodiment of the invention involves the use, as coating agents, of quaternary ammonium compounds containing in the surface-active portion thereof a hydrocarbon radical having at least 8 carbon atoms. The negative radical or negatively charged group of the compounds may be a halide, such as a chloride, or a bromide, or a sulfate, or other negative radical possessing negligible surface-active properties.

Compounds of the type described may be represented by the general formula $$R-\underset{\underset{R_2}{|}}{N}-X$$

in which R represents a hydrocarbon radical having at least eight carbon atoms, $R_2$ represents substituents selected from the group consisting of hydrogen and hydrocarbon radicals having a total valence of 3, and X represents a negatively charged group possessing negligible surface-active properties. More specifically the preferred ammonium compounds may be represented by the general formulae $$R_1\diagdown\underset{\diagup\,|\,\diagdown}{N}\diagup X \qquad \text{and} \qquad R_1-N\diagdown\underset{C=C}{\overset{X}{\diagup}\overset{H}{\underset{H}{\diagup}}\overset{C}{\diagdown}\overset{H}{\underset{H}{\diagdown}}}CH$$
$$\phantom{R_1\diagdown N\diagup}R_2\ R_3\ R_4$$

in which $R_1$ represents an aliphatic hydrocarbon radical having at least eight carbon atoms, $R_2$, $R_3$, and $R_4$ represent substituents selected from the group consisting of hydrogen and hydrocarbon groups and X represents a negatively charged group such as a halogen atom, a sulfate group or other negative group possessing negligible surface-active properties.

Specific examples of compounds which may be used are the following:

Cetyl tributyl ammonium chloride
Dioctyl dimethyl ammonium chloride
Cetyl trimethyl ammonium chloride
Benzyl trimethyl ammonium chloride
Lauryl trimethyl ammonium iodide
Cetyl triethyl ammonium iodide
Lauryl tributyl ammonium bromide
Alkylbenzyl trimethyl ammonium chloride
Wax-benzyl trimethyl ammonium chloride
Cetyl pyridinium iodide
Lauryl pyridinium chloride
Cetyl pyridinium chloride
4-pyridyl pyridinium dibromide
Wax-pyridinium chloride
Cetyl butyl morpholinium iodide
Cetyl quinolinium or isoquinolinium halide
Quaternary ammonium compounds of nitrogen bases from petroleum
Quaternary ammonium compounds of nitrogen bases from shale oil
Cetyl dimethyl amine hydrochloride
Cetyl amine hydrochloride
Oleyl ester of ethanolamine hydrochloride The alkyl benzyl trimethyl ammonium chloride having the probable general formula $$R-C_6H_4-CH_2-N(CH_3)_3Cl$$

in which R is a paraffin wax long chain alkyl radical, may be prepared by chlorinating a paraffin wax of about 130° F. to 135° F. melting point to a chlorine content of about 10% to 15%, reacting the chlorinated wax with benzene in the presence of a catalyst of the Friedel-Crafts type, such as aluminum chloride, reacting the reaction product therefrom with methylene chloride in the presence of a catalyst of the aluminum chloride type and finally reacting the last-named reaction product with trimethyl amine. The various steps in the preparation of this compound may be illustrated by the following equations:

(a) $\quad RH + Cl_2 \longrightarrow RCl + HCl$ (b) $\quad RCl + C_6H_6 \xrightarrow{AlCl_3} R-C_6H_5 + HCl$ (c) $\quad R-C_6H_5 + CH_2Cl_2 \xrightarrow{AlCl_3} R-C_6H_4-CH_2Cl + HCl$ (d) $\quad R-C_6H_4-CH_2Cl + (CH_3)_3N \longrightarrow (R-C_6H_4-CH_2)(CH_3)_3NCl$ in which R represents the long chain aliphatic radical of paraffin wax.

Quaternary pyridinium halides may be prepared from halogenated hydrocarbons, particularly chlorinated paraffin wax, by heating the halogenated wax with pyridine in the presence or absence of catalysts. The preparation of these products is described by the following examples:

1. A mixture of 2.5 gm. pyridine, 10 gm. chlorinated paraffin wax, and 0.2 gm. copper powder was heated to 300–400° F. for about 16 hours. On cooling, the mixture separates into two phases; the lower layer being active in promoting coating of wet sand by road oil.

2. A mix containing 2.5 gm. pyridine, 10 gm. chlorinated paraffin wax, 0.25 gm. CuCl, and 0.5 gm. anhydrous $Na_2CO_3$ was heated to 300–400° F. for about 24 hours. On cooling the mixtures separated into two phases, the lower of which was separated from the remainder of the mixture by decantation, and was purified by solution in benzol and filtration (to remove CuCl and $Na_2CO_3$, etc.), after which the benzol was distilled off. The tarry residue is active in promoting the coating of road oil on wet sand. The anhydrous $Na_2CO_3$ serves as an acid binding agent. Its purpose is to react with any HCl freed by decomposition of chlorinated wax, and thus prevent formation of pyridine hydrochloride.

3. A mixture consisting of 10 gm. chlorinated paraffin wax, 3 gm. pyridine, and 0.05 gm. KI was heated at about 180° F. for about 150 hours. The mixture was active in coating road oil on wet sand.

4. A mixture of chlorinated paraffin wax, $PCl_5$ and pyridine heated at 180° F. for about 15 hours gave a product active in coating road oil on wet sand.

The chlorinated paraffin wax used in these experiments was made by chlorinating a paraffin wax of 132° F. M. P. to a chlorine content of about 10–15%.

It is known that the coating of mineral aggregates by oil or bitumen in the presence of water may be effected, and the resistance of the coating to stripping or displacement by water improved, by treating the aggregate with an aqueous solution of a polyvalent metal salt, and subsequently applying thereto a small amount of a water soluble soap of a fatty acid. The mechanism whereby the aggregate is made preferentially wetted by the bituminous material, and the latter therefore made more adherent to the aggregate, is theoretically as follows: It is believed that one valence of the heavy metal ion is attached to the mineral and another valence reacts with the fatty acid, which thereby becomes attached to the mineral surface with its hydrocarbon chain oriented outwards. When enough of these oriented hydrocarbon chains become attached to the surface the latter becomes water-repellent and preferentially wetted by the oil or bitumen.

The above method has the disadvantage that the relative amounts of the polyvalent metal salt and the soap are critical, and must be correctly adjusted for optimum results. Furthermore, two solutions must be prepared and applied separately or mixed before application. Finally, we have found that with many aggregates the effects obtainable by the above method are less favorable than are obtained with the agents described herein, either in that the amounts of coating agent required to obtain adequate coating are greater, or in that the maximum degree of coating obtainable with any amount of agent is less than with the agents described herein.

We have discovered that siliceous acidic hydrophilic minerals or aggregates, even when wet, can be provided with an adherent coating of oil or bituminous material by employing quaternary ammonium compounds of the types described or named herein. The use in combination therewith of the salt of a heavy metal is unnecessary, thus avoiding the careful and exact proportioning of two reagents which must be done when fatty acid soaps are employed. The coatings so obtained are highly resistant to displacement by water, both immediately or after the mixture has dried. With aggregates which are predominantly of the calcareous, alkaline type but contain some siliceous, acidic minerals, such as limestone containing chert, these agents may advantageously be employed to obtain complete coating when only traces of water are present and/or to improve the resistance of the coating on the chert particles in the mixture to stripping by water entering the mixture in service. With aggregate which are predominantly siliceous and acidic, such as silica sands, natural gravels consisting chiefly of silica and silicates, or crushed silicate rocks, these agents are highly effective in accomplishing the objects enumerated above. It is believed that these agents are effective with such minerals because the surface-active portion of the molecule, which is capable of forming a positively charged ion, becomes attached to the surface of the mineral aggregate (by adsorption, base exchange, or other means) with the hydrocarbon chain or portion oriented away from the surface, as noted above in the case of agents comprised of polyvalent metal salts and fatty acid soaps.

The effectiveness of the herein-named compounds in promoting the coating of siliceous mineral aggregates by oil or bituminous materials is determined by the following test procedure:

A weighed amount of the aggregate, usually from about 30 grams to about 50 grams, is wetted with water, the excess water which can be drained off is removed and a small amount, about 1 to 2 grams, of the coating material such as a road oil, added to the wet aggregate. If the mixture is then mixed, substantially no coating of the mineral aggregate by the road oil or bitumen will occur, because the aggregate is preferentially wetted by water. The coating agent is then added in incremental amounts, and the effect of each addition upon the ability of the coating material to coat the aggregate noted, until further addition of the coating agent has no noticeable effect upon the extent to which the aggregate is coated. The amount of coating reagent required to produce the maximum effect is noted and the coating obtained rated as "no coating," "poor," "fair," "good," or "excellent." Typically, 0.1 to 1.0 cc. of M/20 water solution of a highly effective agent, such as cetyl trimethyl ammonium chloride, is required to obtain an "excellent" coating on sand.

Employing the above-described method the following results were obtained with various quaternary ammonium halides and quaternary pyridinium halides:

| Coating reagent | Coating material | Mineral aggregate | Rating |
| --- | --- | --- | --- |
| Cetyl trimethyl ammonium chloride. | No. 5 road oil. | Silica sand | Excellent. |
| Lauryl trimethyl ammonium chloride. | ...do...... | ...do...... | Good. |
| Dioctyl dimethyl ammonium chloride. | ...do...... | ...do...... | Do. |
| Cetyl triethyl ammonium chloride. | ...do...... | ...do...... | Excellent. |
| Benzyl trimethyl ammonium chloride. | ...do...... | ...do...... | Fair. |
| Wax-benzyl trimethyl ammonium chloride. | ...do...... | ...do...... | Excellent. |
| Cetyl pyridinium iodide | ...do...... | ...do...... | Do. |
| Wax-pyridinium chloride | ...do...... | ...do...... | Good. |
| 4-pyridyl pyridinium dibromide. | ...do...... | ...do...... | Fair. |

In each of the above tests no polyvalent metal activator was used.

The effectiveness of the herein-described agents in preventing the stripping of bituminous coating from siliceous aggregate may be determined by the following tests:

I. Silica sand is coated with road oil in the presence of water and the coating agent being tested as outlined above and the water removed by decantation and evaporation. Another mixture, containing the same amounts of sand and road oil, is prepared using dry sand but no coating agent. These mixtures are allowed to "cure" by standing at atmospheric temperature for 5 to 10 days, after which they are covered with water and allowed to stand at room temperature for several days to determine whether the water will displace the bitumen from the surface of the sand. Optionally, after standing immersed for several days, the mixture of coated aggregate and water may be agitated, as by shaking by hand or in a mechanical shaking machine. When tested in this way, a coated silica sand prepared as outlined above using cetyl trimethyl ammonium chloride showed substantially no stripping of the bituminous coating by water, whereas with a mixture prepared using dry sand and no coating agent there was extensive stripping of the bitumen from the sand.

II. A "water preferential" test for mineral fillers for use in bituminous pavements, described in "Engineering Properties of Soils" by Hogentogler (New York: McGraw-Hill, 1937), p. 382. In this test, 10 grams of the filler are added to 50 cc. of heavy fuel oil and the mixture stirred with a mechanical stirrer to incorporate the filler in the oil. One hundred cc. of water is added and the mixture is again stirred with the mechanical stirrer. The mixture is then allowed to settle until the water becomes clear, and any clean, uncoated filler which collects in the bottom is estimated as the proportion of the total filler used. A satisfactory material is indicated when the filler particles retain the oil and do not separate as clean particles in the bottom of the test container. An unsatisfactory filler will be concentrated on the bottom of the container in the water layer, having separated from the oil. Using an untreated ground silica filler (passing 200 mesh), substantially 100% of the filler was stripped clean and collected in the water on the bottom of the test container. Another 10 gram portion of the filler was shaken with 40 cc. of a 0.88% solution of cetyl trimethyl ammonium chloride, filtered and dried and tested as above. With the treated filler, all of the filler remained in the oil.

III. To 2500 grams of "torpedo" sand (a mixed silica and silicate sand passing 4 mesh and substantially held on 100 mesh) there were added 2% of water, 3% of road oil, and 0.91 grams (equivalent to 0.0364% on the sand or 1.21% on the bitumen) of cetyl trimethyl ammonium bromide. The mixture was mixed until the particles were substantially completely coated and "cured" at atmospheric temperatures, for about one month; first covered (to diminish the evaporation of water and thus simulate the slow loss of water under service conditions) and then uncovered to permit complete drying. A "control" mixture was prepared and "cured" in the same way, except that no coating agent was used. After preparation and curing, there was no great difference in the degree of coating of the two mixtures, as the amount of water used was insufficient to impair the coating as judged by the color of the mixture. The two mixtures were then tested for resistance to stripping of the coating by immersing portions of them in water for 7 days, followed by gentle agitation for 2 hours. At the conclusion of the stripping test, the mixture prepared with coating agent still behaved as a coherent mass and contained only a few uncoated or stripped particles (estimated at 5%), and the water was clear. The control mixture however was extensively stripped and entirely non-coherent, and the water was cloudy from bare fine particles.

Since the amount of coating agent required depends upon the surface area of the aggregate, and since this latter depends, inter alia, upon the particle size distribution, particle shape, and degree of roughness or smoothness of the surface, the proportion of coating agent required may vary within wide limits, from mere traces to as high as 5% or more based on the mineral aggregate. The amount required to produce the desired effects may be determined by tests such as those described above, or by other similar tests, or by examination of the mixture during preparation. In general, we have found that the amount required to produce the optimum effects typically is from 0.001% to 2.5% of the aggregate, or from 0.1 to 2.5% of the bitumen used.

The coating agents described herein may be introduced into the mixture in a variety of ways. Since distribution of amounts of coating agent as small as mere traces over the surface of the aggregate is required, when it is desired to obtain coating of an aggregate which already contains appreciable water the agents can most easily be introduced dissolved or suspended in water. Alternatively, the dry solid material may be added to the mixture in the required proportions. In either of the above methods of addition, it is unnecessary to add the coating agent and distribute it over the surface of the aggregate prior to introduction of the oil or bitumen, i. e., to conduct a separate mixing operation. The coating agent may be added along with, or subsequent to the introduction of the bitumen and distribution of the coating agent and bitumen over the surface of the aggregate accomplished in the same mixing operation.

Alternatively, the coating agent may be dispersed or dissolved in the bitumen in the correct proportion, and applied with the latter. Some of the compounds enumerated herein are crystalline or amorphous solids which do not dissolve readily and directly in oils or bitumens. In such cases it is possible to disperse the required amount of the agent in the bitumen by means of heat, or heat and agitation. Others of the compounds enumerated are oily liquids rather than solids, and these can be dissolved or dispersed in the bitumen, in the required proportions with comparative ease. When the coating agents are added to the aggregate dissolved or dispersed in the bitumen, rather than as water solutions, we have found that for optimum results a small amount of water preferably from about 0.5% to about 5% should preferably be added to the mixture of aggregate, coating agent and bitumen prior to or during mixing if the aggregate does not already contain water. This small amount of water aids in distributing the coating agent over the surface of the aggregate or facilitates its reaction with the aggregate. Better resistance to stripping has been found for mixtures prepared with traces or small amounts of water than for mixtures prepared with completely dry ingredients.

While we have described our invention as applicable to the coating of mineral aggregates with bituminous materials with special reference to highway surfacing, these surface-active agents can also be employed in other instances in which a water-resistant bond between siliceous mineral material and bituminous material is advantageous or necessary. For example, these agents can be employed in preparing bituminous grouts, mastics, caulking or sealing compounds, enamels, or pipe-dips; in preparing filled asphalts, comprised of asphalt and very fine mineral filler, such as are used in composition shingles or roofing; or to improve the adhesion of siliceous mineral granules to asphalt-surfaced roofing.

The present invention is not to be limited by any theory, or by the specific examples given by way of illustration, except insofar as the same is defined by the following claims.

We claim:

1. The method of forming a water resistant bond between a siliceous aggregate and a bituminous material comprising applying to said aggregate a small amount of wax-benzyl trimethyl ammonium chloride.

2. A coating material for wet siliceous aggregates comprising a bituminous material and a small amount of wax-benzyl trimethyl ammonium chloride.

ELTON B. TUCKER.
HENRY M. GRUBB.